United States Patent [19]
Lee

[11] Patent Number: 5,940,016
[45] Date of Patent: Aug. 17, 1999

[54] SYNTAX PARSER FOR A MPEG2 VIDEO DECODER

[75] Inventor: Seong-Won Lee, Seoul, Rep. of Korea

[73] Assignee: Samsung Electronics, Co., Ltd., Suwon, Rep. of Korea

[21] Appl. No.: 08/777,675

[22] Filed: Dec. 20, 1996

[30] Foreign Application Priority Data

Dec. 21, 1995 [KR] Rep. of Korea ...................... 95-53491

[51] Int. Cl.[6] .................................................. H03M 7/40
[52] U.S. Cl. .............................................. 341/67; 348/407
[58] Field of Search ............................... 341/67; 348/407

[56] References Cited

U.S. PATENT DOCUMENTS 5,173,695  12/1992  Sun et al. ................................... 341/67
5,576,765  11/1996  Cheney et al. ........................... 348/407

*Primary Examiner*—Howard L. Williams
*Attorney, Agent, or Firm*—Marger, Johnson, & McCollom, P.C.

[57] ABSTRACT

Disclosed is a syntax parser for a video decoder for MPEG2 and includes: a shift register which executes the shift operation after receiving MPEG video bitstream; a ROM which stores a program decoding variable length and controlling the hardware operation, and outputs the micro-instruction according to an address; a counter which controls the address of the ROM; a register which stores parameters for decoding MPEG video; a flag controller which generates the flag from a particular code included in the bitstream or the combination of parameters, and outputs the flag; a memory which stores the table related to variable length decoding; and a length controller which gets length information to be shifted from the memory, the micro-instruction or the output of the register. The syntax parser for a MPEG2 video decoder can execute VLD and parse the MPEG bitstream. Using micro-instructions to perform the parsing function decreases the decoding time for the bitstream and obtains the parsing speed corresponding to the MP@HL of the HDTV (high definition television) standard.

6 Claims, 3 Drawing Sheets

| CONDITION | SHIFT | SHIFT SELECTION | JUMP DIRECTION | ADDRESS | OTHER COMMAND |
|---|---|---|---|---|---|
| 10 BITS | 8 BITS | 3 BITS | 2 BITS | 8 BITS | 5 BITS |

SYNTAX PARSER FOR A MPEG2 VIDEO DECODER

BACKGROUND OF THE INVENTION

(1) Field of the Invention

The present invention relates to a syntax parser for data in a format defined by MPEG2 (Moving Picture Experts Group 2) for use in a video decoder and, more particularly, to a syntax parser having minimum size and maximum parsing speed by using a micro controller. An embedded microcontroller is used so that micro-instructions for a program may be executed directly without the need for a particular instruction decoder and additional instruction cycles for decoding the instruction.

(2) Description of the Prior Art

MPEG2 is a standard for encoding/decoding video data with high efficiency. MPEG2 can compress a picture of higher quality than television broadcast without visible loss, so it stands out as a basic technique of bandwidth limited applications, such as multimedia and wire/wireless communication.

In general, the process used to decode a compressed picture in MPEG2 format is the following. First, the header information and the start code are removed from the bitstream. Next, the pure data information is decoded by a variable length decoder (VLD). The pixel value of the original picture is restored through an inverse quantization process and an inverse discrete cosine transformation process. With the syntax defined by MPEG2, the header information and the start code are removed from the bitstream and the pure data information is decoded by the VLD.

An example of the VLD function can be found in U.S. Pat. No. 5,173,695. Generally, the syntax of MPEG2 video (ISO/IEC 13818-2) includes variable length codes and conditional sentences. Therefore, a complicated state machine (with, for example, many registers) and many shift operations are needed for parsing variable length codes and conditional sentences.

If the state machine above is hardwired, then the complexity of the hardware is much higher and parsing speed isn't increased because of the corresponding increase in gate stages.

A general purpose processor, such as a digital signal processor or central processing unit, is overkill for the syntax parser because the syntax parser is typically only used for parsing MPEG video.

SUMMARY OF THE INVENTION

It is an object of the present invention to provide a syntax parser having minimum size and maximum parsing speed via a micro controller.

To achieve the above object, the present invention includes:

a read only memory (ROM), which stores a program for decoding the MPEG video syntax and controlling the hardware operation, and outputs the micro-instruction according to the address from the outside;

a program counter which provides the address increasing in order to the ROM and has the provided address jump to a predetermined address when a particular flag is generated;

a shift register which executes the shift operation defined by a predetermined bit corresponding to the length instruction provided from the outside;

a register which operates according to the micro-instruction from the ROM, and stores parameters of the bitstream when the present bitstream stored to the shift register is requested for control;

a flag controller which generates a flag when a particular code is found from the bitstream stored to the shift register, and makes the generated flag transmit to the program counter;

a memory which stores a table for decoding a predetermined variable length data string, and provides the length from table values. The memory is controlled by the micro-instruction stored to the ROM and the information stored to the register; and a length controller which gets a bit number to shift at the present bitstream from the micro-instruction of the ROM, the parameter stored to the register, and the length information provided from the memory, and outputs the bit number to the shift register as the length instruction.

BRIEF DESCRIPTION OF THE DRAWINGS

A more complete appreciation of the invention, and many of the attendant advantages thereof, will be readily apparent as it becomes better understood by reference to the following detailed description when considered in conjunction with the accompanying drawings in which like reference symbols indicate the same or similar components, wherein.

DETAILED DESCRIPTION OF THE PREFERRED EMBODIMENTS

An understanding of the operation and advantages of the present invention will become apparent from the following description of the preferred embodiment of the present invention with reference to the accompanying drawings.

Figures 1, 2:
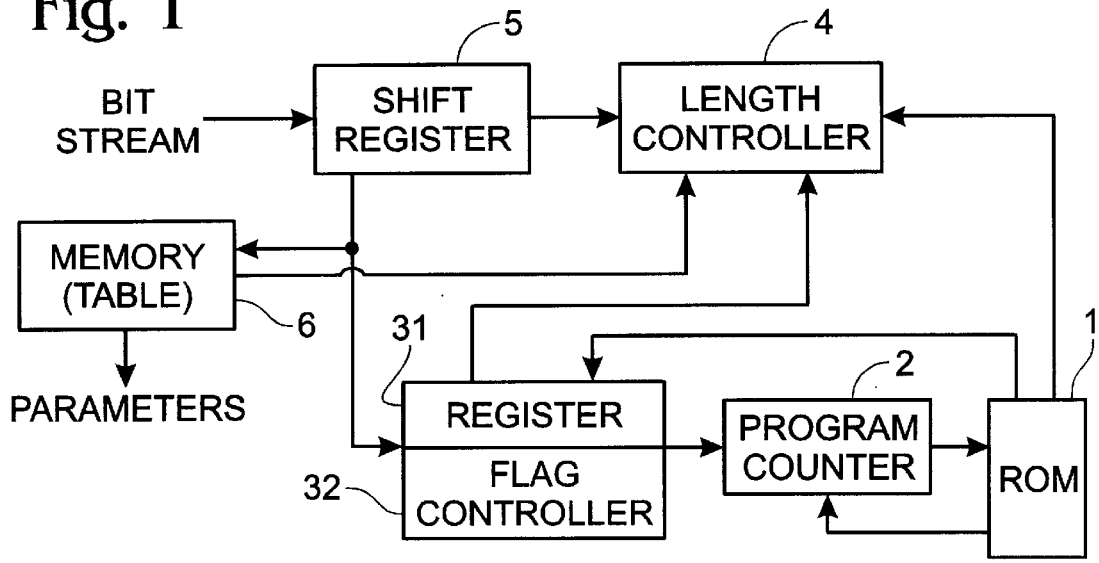
FIG. 1 is a functional block diagram of a syntax parser for a MPEG2 video decoder in accordance with a preferred embodiment of the present invention.
FIG. 2 shows a field structure of the micro-instruction for the syntax parser shown in FIG. 1.

With reference to FIG. 1, a conceptual structure and operation of a syntax parser for a MPEG2 video decoder in accordance with the preferred embodiment of the present invention are shown and explained below.

As shown in FIG. 1, a MPEG video bitstream is inputted into shift register 5, which can process 32 bits of data at a time and is composed of a barrel shift register. The shift operation is executed as the bit number determined according to an output signal of length controller 4.

The bitstream stored in shift register 5 is provided to memory 6, which stores a table for variable length decoding (VLD), register 31 (which stores relevant MPEG2 parameters), and flag controller 32.

ROM 1 stores a program for controlling the operation of the hardware in FIG. 1 and decoding the bitstream. The program, in the form of micro-instructions output from ROM 1, is provided to length controller 4, register 31 and flag controller 32. The program returns to program counter 2 and provides an address to ROM 1 when jumping to a particular position.

Parameters are set in register 31 through control by the micro-instructions and decoded data in the bitstream stored in shift register 5. Flag controller 32 examines a predetermined bit or the least significant byte of the bitstream stored in shift register 5 and also controls the storing of parameters in register 31. In addition, the flag value used for parsing the syntax is produced from a combination of the parameters in register 31 and the bitstream in shift register 5.

Flag controller 32 transmits a return value to length controller 4 and program counter 2, depending upon the micro-instruction output from ROM 1.

Shift register 5 and memory 6 together operate as a VLD.

Length controller 4 transmits several types of length information to shift register 5. The length information includes the following: 1) length information from the micro-instruction; 2) length information included in the bitstream and stored in register 31; and 3) length information output from the data decoded by the VLD in memory 6. In addition, shift register 5 is controlled according to a return value corresponding to the micro-instruction output from ROM 1.

With reference to FIG. 2, the micro-instructions that are stored in ROM 1 and sent to each circuit according to an address input to ROM 1 is explained below. Each micro-instruction includes a 36 bit-word having 10 condition bits, 8 shift bits, 3 shift selection bits, 2 jump direction bits, 8 address bits, and 5 bits for other commands. Each field of the micro-instruction is explained in detail below.

First, the condition field identifies various conditions needed for parsing the syntax and determines whether a shift or jump operation is to be executed. The highest 2 bits indicate the kind of condition, while the 8 lower bits indicate the value of the condition. The meaning of the 2 highest bits is as follows:

00: no operation;

01: return 1 if the value of the lower eight bits is equal to the value of lower eight bits of the input 32 bit bitstream, otherwise return 0;

10: return the bit value corresponding to the input 32 bit bitstream indicating the value of the least significant five bits; and 11: return the flag value of the least significant six bits of the bitstream.

The shift field determines the kind and value of the shift by the flag controller 32. The shift is divided into three parts, in which the highest bit determines whether the shift is executed according to the condition. If the highest bit is 0, then the shift is executed without regard to the condition. If the highest bit is 1, then the shift is executed if the return value of the condition is 0 and the shift isn't executed when the return value of the condition is 1. The next two highest bits of the shift field indicate the kind of shift. The meaning of the next two highest bits is as follows:

00: shift the input by the value of the lowest five bits of the shift field;

01: change the input into the next word;

10: byte align; and

11: shift the input according to the length output by a VLD.

The shift selection field selects the source of the length to shift. This field is composed of three bits, and the meaning of the bit values are as follows:

000: no operation;

001: micro controller;

010: byte align accumulator;

011: dc length register in register 31;

100: fcode[0][0] register in register 31;

101: fcode[0][1] register in register 31;

110: fcode[1][0] register in register 31; and

111: fcode[1][1] register in register 31.

The jump direction field determines the kind of the jump to execute. This field is composed of two bits, and the meaning of the bit values is as follows:

00: jump when the return value of the condition field is 0;

01: jump when the return value of the condition field is 1;

10: jump without regard to the condition field; and

11: perform an address increment operation.

The address field is the value of the target address for the jump operation and is composed of eight bits. Therefore, the micro-instruction program is capable of jumping up to a maximum of 256 lines.

The OTHER COMMAND field is for all operations other than the above commands and is composed of five bits. This field is needed for generating the enable signal for setting the parameters in register 31 and selecting the table in memory 6 for the VLD function. The two highest bits of the OTHER COMMAND field indicate the kind of command and the other three bits indicate the operation of the command. The meaning of the two highest bits are as follows:

00: command for exceptional operation or setting the parameter of the register 31;

01: table selection command for VLD;

11: table selection command for discrete cosine transformation coefficient; and

10: no definition.

When the two highest bits of the OTHER COMMAND field are 00, then the other three bits are as follows:

000: search for the next start code;

001: no operation;

010: hold the present command for 64 clocks;

011: set the MPEG1 register of the register 31;

100: set the register file 1 of the register 31;

101: set the d-picture register of the register 31;

110: set the register file 2 of the register 31; and

111: set the macro block type register of the register 31

When the two highest bits of the OTHER COMMAND field are 01 or 10, then the lower three bits are as follows:

000: select the macro block increment table of the memory 6;

001: select the macro block type table of the memory 6;

010: select the coded block pattern table;

011: select the motion code table;

100: select the differential motion vector table;

101: select the discrete cosine transformation dc size luminance table;

110: select the discrete cosine transformation dc size chrominance table; and

111: select the discrete cosine transformation coefficient table.

The decoding program for parsing the bitstream via micro-instructions is stored in ROM 1.

Figures 3, 3A:
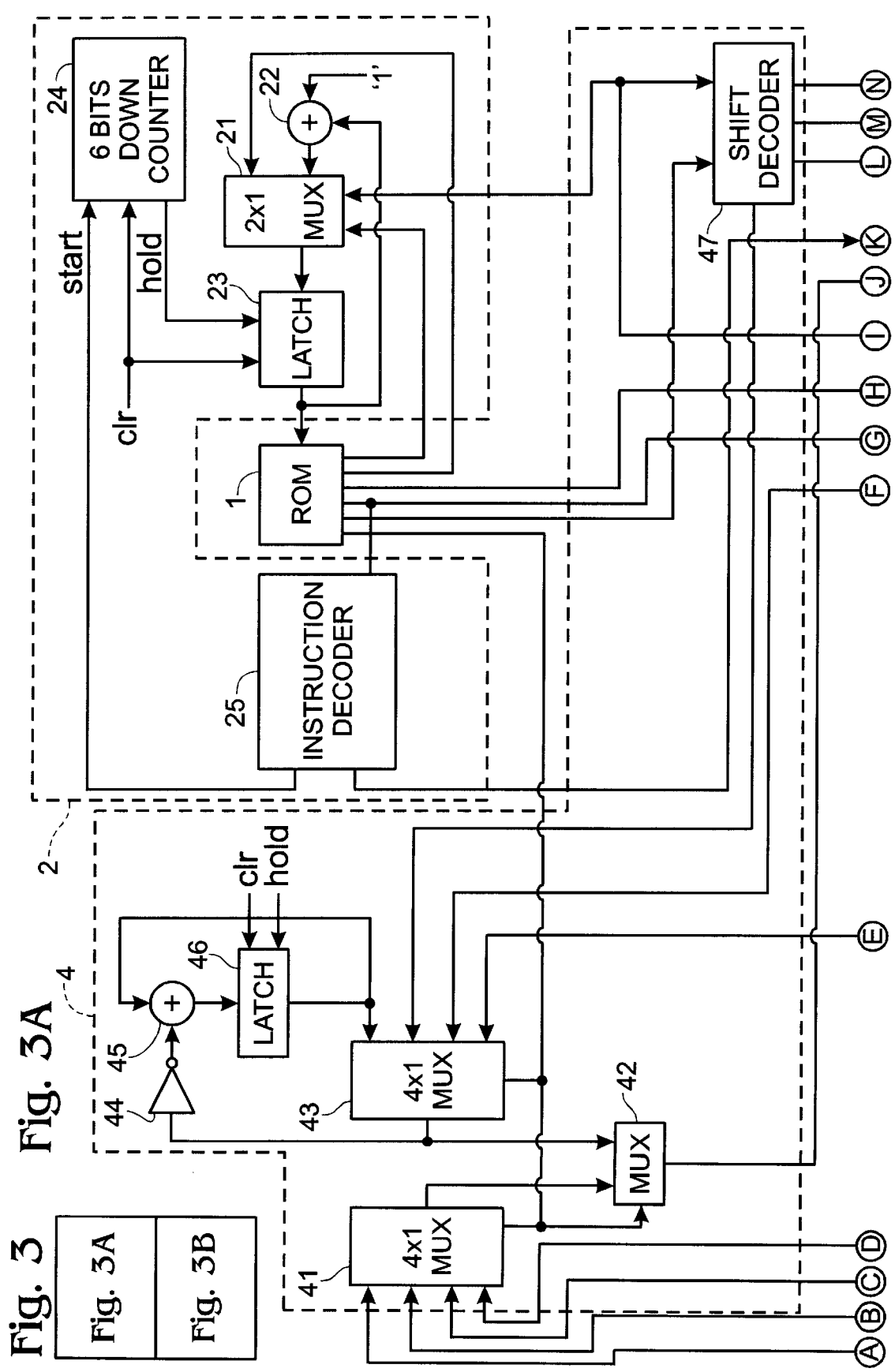
FIGS. 3A and 3B are schematic diagrams illustrating the syntax parser shown in FIG. 1.

Referring now to FIG. 3, the detailed operation of a syntax parser for a MPEG2 video decoder according to the preferred embodiment of the present invention is explained below.

A MPEG 2 encoded bitstream is input to shift register 5 and shift register 5 executes a shift operation of a predetermined length corresponding to the input bitstream according to the signal from shift decoder 47. The bitstream stored in shift register 5 is output to memory 6, register 31, and flag controller 32.

Figure 3B:
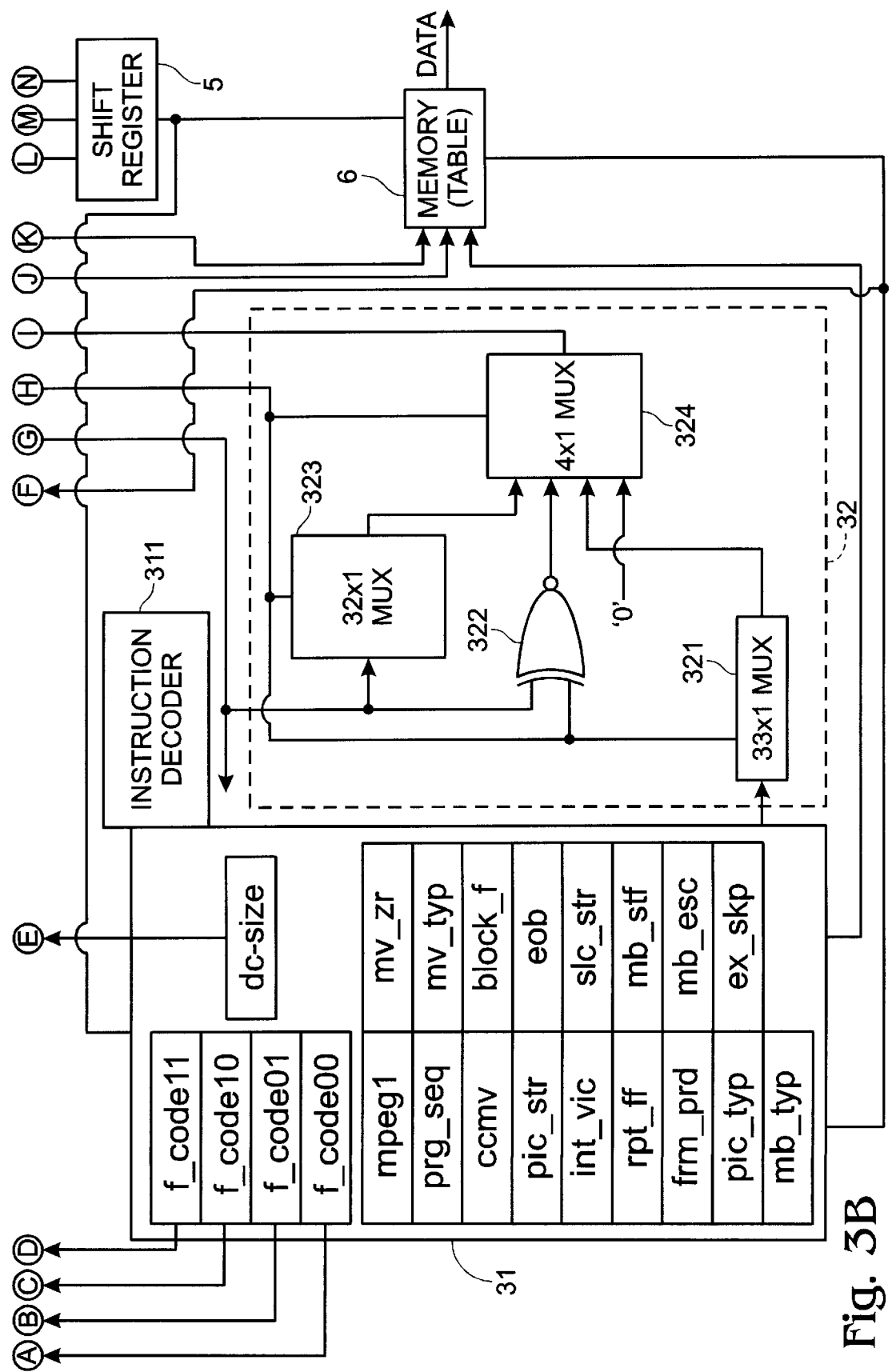

The variable length decode (VLD) operation is executed when the micro-instruction output from ROM 1 through instruction decoder 25 selects a table existing in memory 6. The setting of the parameters in register 31 from values included in the input bitstream is controlled according to the micro-instruction output from ROM 1 through the instruction decoder 311 in register 31. The parameters set in the register 31 are shown in FIG. 3B and are used in the restoration of compressed MPEG2 video data.

Flag controller 32 includes multiplexers 321, 323, and 324, which are controlled by the micro-instructions output from ROM 1; and an exclusive NOR element 322, which is used to search for the start code initially embedded in the bitstream stored in shift register 5.

Multiplexer 323 and exclusive NOR element 322 examine the value of any bit or the least significant byte of the bitstream from shift register 5. Multiplexer 321 produces a flag value used for parsing the syntax based upon the combination of the parameters stored in register 31. A return value corresponding to the condition field of the micro-instruction is output to length controller 4 and program counter 2 through multiplexer 324.

Multiplexer 324 selects the start code from one of the following sources: the output of exclusive NOR element 322; the flag output selected by the multiplexer 321; a 0 value; and the return value of the condition field selected by multiplexer 323. The output of multiplexer 324 is used for controlling multiplexer 21 of program counter 2 and is input to shift decoder 47.

Multiplexer 21 of program counter 2 selects an address value from either the output of adder 22 or a particular address from ROM 1 for input to latch 23. The selected address is provided to ROM 1 through latch 23. The address usually increments by one each instruction cycle, but can also jump in one cycle to a particular address defined by the micro-instruction output from ROM 1.

A 6 bit down counter 24 is controlled by a start signal provided from instruction decoder 25 based upon the micro-instruction output by ROM 1. The operation of latch 23 is controlled by a hold signal output from counter 24.

The micro-instruction output from ROM 1 is provided to instruction decoders 25 and 311, length controller 4, multiplexers 321, 323, and 324 of flag controller 32, and multiplexer 21 of program counter 2.

Shift decoder 47 of length controller 4 executes the operation of holding and shifting the shift register 5 according to the micro-instruction output from ROM 1. Multiplexers 41, 42 and 43 of length controller 4 determine the shift length when executing the VLD function.

A more detailed description of the operation of the preferred embodiment of FIGS. 3A and 3B now follows.

Multiplexer 41 selects one of the parameters stored in register 31 according to the micro-instruction output from ROM 1. Multiplexer 43 selects one of the following: the output of latch 46, the length command output by shift decoder 47, the data related to the VLD selected in memory 6, and the dc-size value stored in register 31. Multiplexer 42 selects either the output from multiplexer 41 or the output of multiplexer 43 and outputs the selected value to memory 6 in order to select the table related to the VLD function. Buffer 44 and adder 45 are connected to latch 46 and are used to generate an increasing shift value stored in latch 46. Latch 46, buffer 44 and adder 45 operate together as a byte align accumulator.

Length controller 4 transmits to shift register 5 one of the following: the length included in the micro-instruction output from ROM 1; the length included in the bitstream and stored in the dc_size field of register 31; the length output from memory 6 from the VLD table; and the length stored in latch 46 as the byte align accumulator. In addition, length controller 4 holds the position of shift register 5 if the return value corresponds to the condition field of the micro-instruction.

The data output from memory 6 as a result of the VLD function is output to an external device for use in the restoration of compressed video according to the MPEG2 specification.

According to the preferred embodiment of the present invention, a syntax parser for a MPEG2 video decoder is provided by using the ROM, the micro-instructions stored in the ROM, the program counter and the flag controller. The function of this syntax parser is to execute variable length decoding (VLD) and correctly parse the MPEG2 bitstream.

The syntax parser of the present invention can decrease the decoding time of the instruction because it uses micro-instructions to parse the MPEG video bitstream.

The parsing speed corresponding to the MP@HL of the HDTV (high definition television) can be obtained by using the syntax parser of the present invention.

What is claimed is:

1. A syntax parser for a MPEG2 video decoder comprising:

a ROM (read only memory) which stores a program decoding the MPEG video syntax and directly controls hardware operation, and outputs a micro instruction according to an address signal, wherein the micro instruction output by the ROM includes a shift value, a shift selection code and a jump address value;

a program counter which provides to said ROM the address signal increasing in order, and capable of performing an address jump to a predetermined address corresponding to the jump address value responsive to a flag signal;

a shift register which stores an MPEG2 bitstream and executes a shift operation according to a bit number in a length command;

a register which operates according to the micro instruction from said ROM, and stores parameters of said bitstream when the present bitstream stored in said shift register is selected for control by the micro instruction;

a flag controller which generates the flag signal when a particular code is detected in the bitstream stored in said shift register, and outputs the flag signal to said program counter;

a memory which stores a table for decoding a predetermined variable length code, and outputs length information from mapping into the table under the control of the micro instruction output from the ROM and responsive to the parameters stored in said register when the variable length decoding is requested from the bitstream stored in said shift register; and a length controller which determines the bit number to shift the present bitstream in the shift register by selecting, responsive to the shift selection code, from one of the shift value of the micro instruction of said ROM, a predetermined one of the parameters stored in said register, and the length information provided from said memory, and outputs the bit number to said shift register as the length command.

2. The device as claimed in claim 1, wherein the partial parameters stored to said register are outputted to said length controller for determining the length to shift according to said micro instruction.

3. The device as claimed in claim 1, wherein said program counter comprises:

an adder which provides the value increasing in order;

a multiplexer which operates according to the output of said flag controller, and selects the micro instruction of said ROM or the output of said adder as an address;

a latch which transmits the output of said multiplexer to said ROM;

a decoder which decodes the micro instruction of said ROM; and a counter which produces and outputs a latch control signal to said latch responsive to a start signal output from said decoder.

4. The device as claimed in claim 1, wherein the micro instruction of said ROM comprises;

a condition field which identifies many kinds of the condition needed for parsing the syntax, and determines whether the shift operation is executed or the jump operation is executed;

a shift field determining a kind and a value of the shift;

a shift selection field determining the source of the length to shift;

a jump direction field determining a kind of the jump on a program; and an address field indicating an address value to jump.

5. The device as claimed in claim 4, further comprising an other command field which indicates the instruction needed for generating the enable signal needed for setting the parameter of said register and selecting the table for VLD (variable length decoding) in said memory.

6. A syntax parser for a MPEG2 video decoder comprising:

a ROM (read only memory) which stores a program decoding the MPEG video syntax and controlling the hardware operation, and outputs the micro instruction according to an address of the outside;

a program counter which provides to said ROM the address increasing in order, and have an address jump to a predetermined address when a particular flag is generated;

a shift register which executes the shift operation according to a predetermined bit corresponding to the length command provided from the outside;

a register which operates according to the micro instruction from said ROM, and stores parameters of said bitstream when the present bitstream stored to said shift register is requested for control;

a flag controller which generates the flag when a particular code is found from the bitstream stored to said shift register, and makes the flag transmit to said program counter;

a memory which stores the table for decoding a predetermined variable length, and provides the length information be mapping to the table by the control of the micro instruction stored to the ROM and the information stored to said register when the variable length decoding is requested from the bitstream stored to said shift register; and a length controller which gets a bit number to shift at the present bitstream from the micro instruction of said ROM, the parameter stored to said register, or the length information provided from said memory, and outputs the bit number to said shift register as the length command; and wherein said flag controller further comprises:

an exclusive OR element which searches the start code from the input bitstream stored to said shift register;

a first multiplexer which selects one of the parameters stored to said register according to said micro instruction;

a second multiplexer which selects the value of any bit or least significant byte of the input bitstream stored to said shift register according to said micro instruction; and a third multiplexer which provides the flag for parsing the syntax to said program counter and said length controller by selecting one of the output of each multiplexer and said exclusive OR element according to said micro instruction.

* * * * *